United States Patent [19]

Iwamoto et al.

[11] Patent Number: 5,612,268

[45] Date of Patent: Mar. 18, 1997

[54] DIELECTRIC CERAMIC COMPOSITION

[75] Inventors: Sakiko Iwamoto; Masamitsu Shibata; Yukio Hamaji, all of Kyoto, Japan

[73] Assignee: Murata Manufacturing Co., Ltd., Japan

[21] Appl. No.: 447,234

[22] Filed: May 22, 1995

[30] Foreign Application Priority Data

May 24, 1994 [JP] Japan ................................. 6-109840
May 24, 1994 [JP] Japan ................................. 6-109841

[51] Int. Cl.$^6$ .................. C04B 35/462; C04B 35/475; C04B 35/495
[52] U.S. Cl. .......................... 501/138; 501/137; 501/139
[58] Field of Search ............................ 501/137, 138, 501/139; C04B 35/46, 35/49

[56] References Cited

U.S. PATENT DOCUMENTS

| | | | |
|---|---|---|---|
| 3,345,188 | 10/1967 | Honma | 106/39 |
| 3,997,457 | 12/1976 | Takahashi et al. | 501/137 |
| 4,988,650 | 1/1991 | Takagi et al. | 501/138 |
| 5,238,887 | 8/1993 | Kato et al. | 501/138 |
| 5,250,481 | 10/1993 | Park | 501/138 |
| 5,256,639 | 10/1993 | Fujimaru et al. | 501/139 |
| 5,292,694 | 3/1994 | Abe et al. | 501/139 |
| 5,296,424 | 3/1994 | Wang et al. | 501/138 |
| 5,304,521 | 4/1994 | Abe et al. | 501/139 |
| 5,350,721 | 9/1994 | Abe et al. | 501/139 |
| 5,397,753 | 3/1995 | Nishiyama et al. | 501/138 |
| 5,432,136 | 7/1995 | Shibata et al. | 501/138 |

FOREIGN PATENT DOCUMENTS 0186095  12/1985  European Pat. Off. .

Primary Examiner—Mark L. Bell
Assistant Examiner—Louis M. Troilo
Attorney, Agent, or Firm—Ostrolenk, Faber, Gerb & Soffen, LLP

[57] ABSTRACT

The present invention relates to a dielectric ceramic composition, comprising from 97.5 to 99.95% by weight of $$\{100-(a+b+c+d)\}BaTiO_3 + aZnO + b(2Bi_2O_3 \cdot 3AO_2) + cTa_2O_5 + dRe_2O_3$$

as main component and from 0.05 to 2.5% by weight of glass mainly comprising $SiO_2$, and possibly also containing from 0.01 to 0.5% by weight of at least one oxides of Cr, Mn, Fe, Co, and/or Ni. A represents Zr or Sn; Re represents at least one of La, Pr, Nd, Sm, Dy and Er; and $\{100-(a+b+c+d)\}$, a, b, c, and d represent molar percent which satisfy the following relationships:

$$0.5 \leq a \leq 4.5$$
$$0.5 \leq b \leq 4.5$$
$$0.5 \leq c \leq 4.5$$
$$0.5 \leq d \leq 5.5.$$

11 Claims, No Drawings

DIELECTRIC CERAMIC COMPOSITION

FIELD OF THE INVENTION

The present invention relates to a dielectric ceramic composition and more particularly to a dielectric ceramic composition which can be used as a material of laminated ceramic capacitors.

BACKGROUND OF THE INVENTION

Heretofore, as a dielectric ceramic composition which exhibits a small voltage dependence, high ceramic strength, and flat dielectric constant-temperature characteristics there has been widely known a ceramic composition mainly composed of $BaTiO_3$ comprising a bismuth compound and a rare earth element incorporated therein as subsidiary components.

Besides the dielectric ceramic composition having the foregoing formulation, a dielectric ceramic composition mainly composed of $BaTiO_3$ comprising $Nb_2O_5$, rare earth oxides, and oxide of transition metals such as Cr, Mn, Fe, Co and Ni incorporated therein as subsidiary components is reported to exhibit flat dielectric constant-temperature characteristics irrespective of its dielectric constant as high as not less than 3,000.

The temperature characteristics of these dielectric ceramic compositions satisfy X7R characteristics of EIA Standard stipulating that the percent capacitance change from the capacitance at +25° C. as reference be within ±15% in the temperature range of from −55° C. to +125° C.

However, the dielectric ceramic composition mainly composed of $BaTiO_3$ comprising a bismuth compound incorporated therein exhibits a dielectric constant as low as about 1,000. If the dielectric constant is raised, the capacitance change with temperature becomes large. In addition, when a green composition is calcined at an elevated temperature, such a dielectric ceramic composition is subject to evaporation of $Bi_2O_3$, causing the ceramic to be deformed or change in the percent composition, and hence making it impossible to obtained required electrical characteristics or mechanical strength or causing these characteristics to be scattered.

The dielectric ceramic composition mainly composed of $BaTiO_3$ comprising $Nb_2O_5$, rare earth oxides, and oxide of transition metals such as Cr, Mn, Fe, Co and Ni incorporated therein as subsidiary components exhibits a dielectric constant of not less than 3,000 and flat temperature characteristics. However, this dielectric ceramic composition must be fired at a temperature as high as not lower than 1,200° C.

In recent years, ceramic capacitors tend to have a smaller size. In particular, laminated ceramic capacitors tend to be composed of thinner dielectric ceramic layers having a thickness of from 5 to 15 μm for miniaturization and larger capacitance. A dielectric ceramic composition having a small voltage dependence is thus desired.

However, since the foregoing dielectric ceramic composition having a high dielectric constant exhibits a large voltage dependence, its thickness cannot be reduced as required by the recent market, making it impossible to prepare a small-sized large capacitance laminated ceramic capacitor. Further, since the foregoing dielectric ceramic composition exhibits a low ceramic mechanical strength, it may be destroyed during using.

SUMMARY OF THE INVENTION

An object of the present invention is to provide a dielectric ceramic composition which can be sintered at a temperature of not higher than 1,160° C., exhibits a percent capacitance change of from −15% to +15% with temperature from the capacitance at +25° C. in a wide temperature range of from −55° C. to +125° C. and a high ceramic mechanical strength, can be operated at a relatively high rated voltage even if the thickness of the dielectric ceramic layers is as low as 5 to 15 μm, and shows a small percent capacitance change with temperature at an applied voltage of 50% of the rated voltage in accordance with the specification of RB characteristics of JIS C6429.

Other objects and effects of the present invention will be apparent from the following description.

The present invention relates to a dielectric ceramic composition, comprising from 97.5 to 99.95% by weight of a main component and from 0.05 to 2.5% by weight of a first subsidiary component.

The present invention also relates to a dielectric ceramic composition, comprising from 97.0 to 99.94% by weight of a main component, from 0.05 to 2.5% by weight of a first subsidiary component, and from 0.01 to 0.5% by weight of a second subsidiary component.

The main component is a mixture represented by formula:

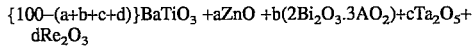

$$\{100-(a+b+c+d)\}BaTiO_3 + aZnO + b(2Bi_2O_3 \cdot 3AO_2) + cTa_2O_5 + dRe_2O_3$$

wherein A represents Zr or Sn; Re represents at least one selected from the group consisting of La, Pr, Nd, Sm, Dy and Er; and $\{100-(a+b+c+d)\}$, a, b, c, and d represent the contents of $BaTiO_3$, ZnO, $(2Bi_2O_3 \cdot 3AO_2)$, $Ta_2O_5$, and $Re_2O_3$ in terms of molar percent, respectively, provided that a, b, c, and d satisfy the following relationships:

| |
|---|
| $0.5 \leq a \leq 4.5$ |
| $0.5 \leq b \leq 4.5$ |
| $0.5 \leq c \leq 4.5$ |
| $0.5 \leq d \leq 5.5$ |

The first subsidiary component is glass mainly comprising $SiO_2$.

The second subsidiary component is at least one selected from the group consisting of oxides of Cr, Mn, Fe, Co, and Ni.

The dielectric ceramic composition according to the present invention can be sintered at a temperature as low as not higher than 1,160° C. and shows a small percent capacitance change with temperature (bias TC) when a direct current is applied. Therefore, the thickness of the dielectric ceramic can be reduced to from 5 to 15 μm. As a result, a laminated ceramic capacitor having a smaller size and a higher capacitance can be provided.

Further, since the dielectric ceramic composition according to the present invention has a high ceramic mechanical strength, it is not susceptible to damage such as cracking or chipping during use when incorporated in laminated ceramic capacitors. Thus, any accident such as fire damage due to short circuit and heat generation can be prevented.

Moreover, the dielectric ceramic composition according to the present invention shows a percent capacitance change as small as from −15% to +15% with temperature from the capacitance at +25° C. as a reference in a wide temperature range of from −55° C. to +125° C. and hence is thermally stable. This shows that the dielectric ceramic composition according to the present invention finds wide application as dielectric ceramic for industrial use or consumer use.

DESCRIPTION OF THE PREFERRED EMBODIMENTS

The present invention will be described in detail below with reference to preferred embodiments thereof, but the invention is not construed as being limited thereto.

A process for the preparation of the main component of the dielectric ceramic composition will be first described. Commercially available industrial materials of $BaTiO_3$, ZnO, $Bi_2O_3$, $ZrO_2$ or $SnO_2$, $Ta_2O_5$ and $Re_2O_3$ (in which Re represents La, Pr, Nd, Sm, Dy or Er) were used as starting materials. These starting materials were each measured out such that ceramic compositions set forth in Tables 1 and 5 were obtained. These starting materials were wet-ground in admixture over 16 hours by means of a ball mill, and then evaporated to dryness to obtain powder mixtures. The powder mixtures were each then charged into a zirconia crucible. The powder mixtures were each calcined at a temperature of 1,000° C. in a natural atmosphere over 2 hours, and then coarsely ground to obtain 200-mesh sieve fractions as powdered starting materials of main component of dielectric ceramic composition.

A process for the preparation of a first subsidiary component of the dielectric ceramic composition will be next described. In the present example, as the first subsidiary component which lowers the sintering temperature to not higher than 1,160° C., an oxide glass represented by $8BaO-6SrO-6CaO-30Li_2O-50SiO_2$ (by mole) was used. Commercially available industrial materials of $BaCO_3$, $SrCO_3$, $CaCO_3$, $Li_2O$ and $SiO_2$ were used as starting materials. These starting materials were each measured out such that the foregoing compositions were obtained. These starting materials were wet-ground in admixture over 16 hours by means of a ball mill, and then evaporated to dryness to obtain powder mixtures. Each powder mixture was put into an alumina crucible where it was then allowed to stand at a temperature of 1,300° C. over 1 hour. The molten powder was then quenched rapidly so that it was vitrified. The material thus vitrified was then ground to obtain 200-mesh sieve fractions as powdered starting materials of first subsidiary component of dielectric ceramic composition.

The powdered starting materials of first subsidiary component were each added to the powdered starting material of the main component in a weight proportion set forth in Tables 1 and 5.

Commercially available industrial materials of $Cr_2O_3$, $MnO_2$, $Fe_2O_3$, $Co_2O_3$ and NiO were used as the second subsidiary component. These second subsidiary components were each added to a composition composed of $93.0BaTiO_3+1.5ZnO+1.5(2Bi_2O_3.3ZrO_2)+2.0Ta_2O_5+2.0Nd_2O_3$ (by mole) (for Sample Nos. 21 to 30) or $93.0BaTiO_3+1.5ZnO+1.5(2Bi_2O_3.3SnO_2)+2.0Ta_2O_5+2.0Nd_2O_3$ (by mole) (for Sample Nos. 21' to 30') comprising 1.0% by weight of the foregoing first subsidiary component incorporated therein in such an amount that ceramic compositions set forth in Tables 2 and 6 were obtained.

To the mixture were then added a polyvinyl butyral binder and an organic solvent such as toluene and ethyl alcohol. These materials were then mixed in a wet process by means of a ball mill over 16 hours. The mixture was then formed into a sheet by doctor blade coating method to obtain a green sheet. The thickness of the green sheet thus obtained was 19 μm. An internal electrode pattern was then printed on the green sheet with a paste made of a 70/30 (in terms of weight percent) mixture of Ag and Pd. These green sheets were then laminated in 6 layers. The laminate was then subjected to hot contact bonding with dummy sheets. Formed samples having a length of 5.5 mm, a width of 4.5 mm and a thickness of 1 mm were cut out from the laminates thus contact-bonded. The formed samples were each then fired at a temperature set forth in Tables 3, 4, 7 and 8 to obtain sintered samples. The thickness of the dielectric materials thus sintered was 13 μm.

A silver electrode was printed on the edge of the sintered samples to obtain samples (laminated capacitors) to be measured. These samples were measured for dielectric constant ($\epsilon$), dielectric loss ($\tan\delta$), TC and bias TC at room temperature.

The dielectric constant ($\epsilon$) and dielectric loss ($\tan\delta$) were measured at a temperature of 25° C., 1 kHz and 1 Vrms. For the measurement of TC, the absolute value of the maximum percent capacitance change with temperature between −55° C. and +125° C. from the capacitance at 25° C. as a reference, i.e., maximum percent capacitance change ($|\Delta C/C|_{max}$) was determined. For the measurement of bias TC, the capacitance was determined while a direct current voltage of 25 V being applied in the foregoing temperature range, and the maximum capacitance change ($\Delta C_{maxB}$) from the capacitance at 25° C. and an applied voltage of 0 V as a reference was determined.

Further, the ceramic bending strength was measured by three-point bending test. Starting materials having formulation set forth in Tables 1, 2, 5 and 6 were press-formed into formed articles having a length of 35 mm, a width of 7 mm and a thickness of 1.2 mm. These formed articles were each then fired at temperatures set forth in Tables 3 and 4 over 2 hours to obtain strip ceramics. Thereafter, 20 samples having different compositions were each then measured for bending strength. These measurements were averaged to determine the bending strength of each composition.

The results of these tests on the compositions in Tables 1, 2, 5 and 6 are set forth in Tables 3, 4, 7 and 8, respectively.

In Tables 1 to 8, samples indicated with an asterisk are outside the scope of the present invention.

TABLE 1

| Sample No. | Main component (wt %) [100 − (a + b + c + d)] BaTiO3 + aZnO + b(2Bi2O3.3ZrO2) + cTa2O5 + dRe2O3 | | | | | | | | | | Amount of main component (wt %) | Amount of first subsidiary component (wt %) |
|---|---|---|---|---|---|---|---|---|---|---|---|---|
| | 100 − (a + b + c + d) | a | b | c | d | | | | | | | |
| | | | | | La2O3 | Pr2O3 | Nd2O3 | Sm2O3 | Dy2O3 | Er2O3 | | |
| 1 | 93 | 1.5 | 2.5 | 2 | 0 | 0 | 1 | 0 | 0 | 0 | 99 | 1 |
| 2 | 89 | 2 | 4 | 3 | 0.5 | 1 | 0 | 0 | 0.5 | 0 | 98 | 2 |
| 3 | 87.5 | 1 | 4.5 | 4 | 0 | 0 | 2.5 | 0 | 0.5 | 0 | 99.5 | 0.5 |
| 4 | 91 | 4 | 2 | 1 | 0.5 | 0 | 0 | 0.5 | 0 | 1 | 99 | 1 |

TABLE 1-continued

| Sample No. | Main component (wt %) [100 − (a + b + c + d)] BaTiO3 + aZnO + b(2Bi2O3.3ZrO2) + cTa2O5 + dRe2O3 | | | | | | | | | | Amount of main component (wt %) | Amount of first subsidiary component (wt %) |
|---|---|---|---|---|---|---|---|---|---|---|---|---|
| | 100 − (a + b + c + d) | a | b | c | La2O3 | Pr2O3 | Nd2O3 | Sm2O3 | Dy2O3 | Er2O3 | | |
| 5 | 93 | 1.5 | 3 | 1.5 | 0 | 0.5 | 0 | 0 | 0 | 0.5 | 98.9 | 1.5 |
| 6 | 86.5 | 2.5 | 3 | 3 | 2.5 | 0 | 2.5 | 0 | 0 | 0 | 99.5 | 0.5 |
| 7 | 88.5 | 4.5 | 2.5 | 2 | 0 | 1 | 0 | 0 | 1.5 | 0 | 98 | 2 |
| 8 | 86.5 | 1.5 | 3 | 4.5 | 0 | 0 | 2.5 | 1.5 | 0 | 0.5 | 98 | 2 |
| * 9 | 93.7 | 0.3 | 2.5 | 2 | 0.5 | 0 | 0.5 | 0 | 0.5 | 0 | 99 | 1 |
| * 10 | 86.8 | 4.7 | 4 | 3 | 0 | 0 | 1.5 | 0 | 0 | 0 | 99.5 | 0.5 |
| * 11 | 93.2 | 1.5 | 0.3 | 2.5 | 0 | 0 | 0 | 2 | 0 | 0.5 | 98 | 2 |
| * 12 | 85.8 | 2 | 4.7 | 4.5 | 0 | 0 | 3 | 0 | 0 | 0 | 99.5 | 0.5 |
| * 13 | 92.7 | 1 | 4 | 0.3 | 0 | 2 | 0 | 0 | 0 | 0 | 99 | 1 |
| * 14 | 88.8 | 1.5 | 2.5 | 4.7 | 0 | 0 | 0 | 2.5 | 0 | 0 | 99 | 1 |
| * 15 | 93.7 | 1.5 | 2.5 | 2 | 0.3 | 0 | 0 | 0 | 0 | 0 | 99 | 1 |
| * 16 | 87.8 | 1.5 | 3 | 2 | 0 | 0.7 | 2.5 | 2.5 | 0 | 1.5 | 99.5 | 0.5 |
| * 17 | 93 | 1.5 | 2.5 | 2 | 0 | 0 | 1 | 0 | 0 | 0 | 100 | 0 |
| 18 | 91.5 | 4 | 2 | 1 | 0 | 0 | 1.5 | 0 | 0 | 0 | 99.95 | 0.05 |
| 19 | 92 | 1.5 | 2.5 | 2 | 0 | 0 | 2 | 0 | 0 | 0 | 97.5 | 2.5 |
| * 20 | 91 | 4 | 2 | 1 | 0 | 0 | 2 | 0 | 0 | 0 | 97.3 | 2.7 |

TABLE 2

| Sample No. | Amount of ceramic composition (wt %) | Amount of second subsidiary component (wt %) | | | | |
|---|---|---|---|---|---|---|
| | | Cr | Mn | Fe | Co | Ni |
| 21 | 99.99 | 0 | 0.01 | 0 | 0 | 0 |
| 22 | 99.85 | 0.05 | 0.05 | 0.05 | 0 | 0 |
| 23 | 99.95 | 0 | 0 | 0 | 0.05 | 0 |
| 24 | 99.9 | 0.05 | 0 | 0 | 0 | 0.05 |
| 25 | 99.85 | 0 | 0.1 | 0 | 0 | 0.05 |
| 26 | 99.65 | 0.05 | 0.2 | 0.05 | 0.05 | 0 |
| 27 | 99.5 | 0 | 0.3 | 0 | 0 | 0.1 |
| 28 | 99.55 | 0 | 0.3 | 0 | 0.1 | 0.05 |
| 29 | 99.5 | 0.1 | 0.3 | 0 | 0.1 | 0 |
| * 30 | 99.45 | 0 | 0.35 | 0.05 | 0.1 | 0.05 |

Note:
"Amount of ceramic composition" represents the total amount of the main component and the first subsidiary component.

TABLE 3

| Sample No. | Firing temperature (°C.) | Electric property | | | | Mechanical property |
|---|---|---|---|---|---|---|
| | | ε | tan δ (%) | TC (%) \|ΔC/C\|max | Bias TC (%) ΔCmaxδ | Bending strength (kg/cm²) |
| 1 | 1150 | 2010 | 1.6 | 7.4 | −33.2 | 2060 |
| 2 | 1110 | 1790 | 1.5 | 7.2 | −30.9 | 2310 |
| 3 | 1110 | 1800 | 1.5 | 14.1 | −31.0 | 2160 |
| 4 | 1160 | 2000 | 1.8 | 12.0 | −34.0 | 1800 |
| 5 | 1130 | 1760 | 1.7 | 7.4 | −32.1 | 2210 |
| 6 | 1090 | 1370 | 1.0 | 13.9 | −28.0 | 2200 |
| 7 | 1110 | 1590 | 1.1 | 14.6 | −33.1 | 2090 |
| 8 | 1110 | 1620 | 1.5 | 12.0 | −32.3 | 2120 |
| * 9 | 1160 | 1690 | 2.2 | 17.2 | −33.8 | 1490 |
| * 10 | 1130 | 2210 | 1.4 | 22.1 | −42.7 | 2030 |
| * 11 | 1130 | 1710 | 1.8 | 23.2 | −36.1 | 1470 |
| * 12 | 1110 | 970 | 1.1 | 14.8 | −28.3 | 2250 |
| * 13 | 1110 | 1820 | 1.4 | 22.7 | −31.0 | 2280 |
| * 14 | 1150 | 1510 | 1.1 | 16.5 | −33.1 | 1990 |
| * 15 | 1150 | 1920 | 1.3 | 22.0 | −41.2 | 2000 |
| * 16 | 1130 | 1500 | 1.8 | 18.4 | −44.5 | 2110 |
| * 17 | | | | Not sintered at 1,160° C. | | |
| 18 | 1160 | 1680 | 1.3 | 13.1 | −36.0 | 1620 |
| 19 | 1090 | 1380 | 1.0 | 7.3 | −33.5 | 2140 |
| * 20 | 1090 | 940 | 1.1 | 13.9 | −35.8 | 2090 |

TABLE 4

| Sample No. | Firing temperature (°C.) | Electric property | | | | Mechanical property |
|---|---|---|---|---|---|---|
| | | $\epsilon$ | tan δ (%) | TC (%) $|\Delta C/C|_{max}$ | bias TC (%) $\Delta C_{maxB}$ | Bending strength (kg/cm²) |
| 21 | 1130 | 1920 | 1.6 | 7.4 | −33.4 | 2040 |
| 22 | 1130 | 1830 | 1.8 | 7.3 | −33.6 | 2020 |
| 23 | 1130 | 1940 | 1.5 | 7.4 | −34.2 | 1970 |
| 24 | 1130 | 1890 | 1.7 | 7.3 | −32.8 | 2030 |
| 25 | 1130 | 1870 | 1.6 | 7.3 | −33.4 | 2040 |
| 26 | 1130 | 1880 | 2.0 | 7.3 | −33.8 | 1960 |
| 27 | 1130 | 1860 | 2.0 | 7.3 | −32.3 | 1950 |
| 28 | 1130 | 1900 | 2.1 | 7.4 | −35.6 | 1980 |
| 29 | 1130 | 1890 | 2.2 | 7.3 | −33.2 | 1960 |
| * 30 | 1130 | 1870 | 2.7 | 12.0 | −32.5 | 1990 |

TABLE 5

| Sample No. | Main component (wt %) [100 − (a + b + c + d)] BaTiO3 + aZnO + b(2Bi2O3.3SnO2) + cTa2O5 + dRe2O3 | | | | | | | | | | Amount of main component (wt %) | Amount of first subsidary component (wt %) |
|---|---|---|---|---|---|---|---|---|---|---|---|---|
| | 100 − (a + b + c + d) | a | b | c | \multicolumn{6}{c}{d} | | |
| | | | | | La2O3 | Pr2O3 | Nd2O3 | Sm2O3 | Dy2O3 | Er2O3 | | |
| 1' | 93 | 1.5 | 2.5 | 2 | 0 | 0 | 1 | 0 | 0 | 0 | 99 | 1 |
| 2' | 89 | 2 | 4 | 3 | 0.5 | 1 | 0 | 0 | 0.5 | 0 | 98 | 2 |
| 3' | 87.5 | 1 | 4.5 | 4 | 0 | 0 | 2.5 | 0 | 0.5 | 0 | 99.5 | 0.5 |
| 4' | 91 | 4 | 2 | 1 | 0.5 | 0 | 0 | 0.5 | 0 | 1 | 99 | 1 |
| 5' | 93 | 1.5 | 3 | 1.5 | 0 | 0.5 | 0 | 0 | 0 | 0.5 | 98.5 | 1.5 |
| 6' | 86.5 | 2.5 | 3 | 3 | 2.5 | 0 | 2.5 | 0 | 0 | 0 | 99.5 | 0.5 |
| 7' | 88.5 | 4.5 | 2.5 | 2 | 0 | 1 | 0 | 0 | 1.5 | 0 | 98 | 2 |
| 8' | 86.5 | 1.5 | 3 | 4.5 | 0 | 0 | 2.5 | 1.5 | 0 | 0.5 | 98 | 2 |
| * 9' | 93.7 | 0.3 | 2.5 | 2 | 0.5 | 0 | 0.5 | 0 | 0.5 | 0 | 99 | 1 |
| * 10' | 86.8 | 4.7 | 4 | 3 | 0 | 0 | 1.5 | 0 | 0 | 0 | 99.5 | 0.5 |
| * 11' | 93.2 | 1.5 | 0.3 | 2.5 | 0 | 0 | 0 | 2 | 0 | 0.5 | 98 | 2 |
| * 12' | 85.8 | 2 | 4.7 | 4.5 | 0 | 0 | 3 | 0 | 0 | 0 | 99.5 | 0.5 |
| * 13' | 92.7 | 1 | 4 | 0.3 | 0 | 2 | 0 | 0 | 0 | 0 | 99 | 1 |
| * 14' | 88.8 | 1.5 | 2.5 | 4.7 | 0 | 0 | 0 | 2.5 | 0 | 0 | 99 | 1 |
| * 15' | 93.7 | 1.5 | 2.5 | 2 | 0.3 | 0 | 0 | 0 | 0 | 0 | 99 | 1 |
| * 16' | 87.8 | 1.5 | 3 | 2 | 0 | 0.7 | 2.5 | 2.5 | 0 | 1.5 | 99.5 | 0.5 |
| * 17' | 93 | 1.5 | 2.5 | 2 | 0 | 0 | 1 | 0 | 0 | 0 | 100 | 0 |
| 18' | 91.5 | 4 | 2 | 1 | 0 | 0 | 1.5 | 0 | 0 | 0 | 99.95 | 0.05 |
| 19' | 92 | 1.5 | 2.5 | 2 | 0 | 0 | 2 | 0 | 0 | 0 | 97.5 | 2.5 |
| * 20' | 91 | 4 | 2 | 1 | 0 | 0 | 2 | 0 | 0 | 0 | 97.3 | 2.7 |

TABLE 6

| Sample No. | Amount of ceramic composition (wt %) | Amount of second subsidiary component (wt %) | | | | |
|---|---|---|---|---|---|---|
| | | Cr | Mn | Fe | Co | Ni |
| 21' | 99.99 | 0 | 0.01 | 0 | 0 | 0 |
| 22' | 99.85 | 0.05 | 0.05 | 0.05 | 0 | 0 |
| 23' | 99.95 | 0 | 0 | 0 | 0.05 | 0 |
| 24' | 99.9 | 0.05 | 0 | 0 | 0 | 0.05 |
| 25' | 99.85 | 0 | 0.1 | 0 | 0 | 0.05 |
| 26' | 99.65 | 0.05 | 0.2 | 0.05 | 0.05 | 0 |
| 27' | 99.5 | 0 | 0.3 | 0 | 0 | 0.1 |
| 28' | 99.55 | 0 | 0.3 | 0 | 0.1 | 0.05 |
| 29' | 99.5 | 0.1 | 0.3 | 0 | 0.1 | 0 |
| * 30' | 99.45 | 0 | 0.35 | 0.05 | 0.1 | 0.05 |

Note:
"Amount of ceramic composition" represents the total amount of the main component and the first subsidiary component.

TABLE 7

| Sample No. | Firing temperature (°C.) | Electric property ε | tan δ (%) | TC (%) $|\Delta C/C|_{max}$ | bias TC (%) $\Delta C_{max\delta}$ | Mechanical property Bending strength (kg/cm$^2$) |
|---|---|---|---|---|---|---|
| 1' | 1150 | 2000 | 1.5 | 7.4 | −33.4 | 2050 |
| 2' | 1100 | 1800 | 1.5 | 7.4 | −31.1 | 2300 |
| 3' | 1110 | 1790 | 1.6 | 14.3 | −30.9 | 2170 |
| 4' | 1160 | 2010 | 1.8 | 12.5 | −34.1 | 1820 |
| 5' | 1140 | 1770 | 1.7 | 7.2 | −32.5 | 2230 |
| 6' | 1100 | 1390 | 1.1 | 13.8 | −28.3 | 2210 |
| 7' | 1100 | 1600 | 1.2 | 14.3 | −33.0 | 2100 |
| 8' | 1110 | 1610 | 1.6 | 12.2 | −31.8 | 2110 |
| * 9' | 1160 | 1700 | 2.1 | 17.8 | −33.6 | 1510 |
| * 10' | 1120 | 2200 | 1.3 | 22.0 | −42.5 | 2010 |
| * 11' | 1130 | 1720 | 1.8 | 23.2 | −36.0 | 1480 |
| * 12' | 1100 | 980 | 1.1 | 14.9 | −28.4 | 2250 |
| * 13' | 1100 | 1830 | 1.3 | 22.9 | −30.7 | 2270 |
| * 14' | 1150 | 1520 | 1.2 | 17.0 | −33.0 | 1990 |
| * 15' | 1150 | 1910 | 1.4 | 22.1 | −41.2 | 2000 |
| * 16' | 1130 | 1610 | 1.7 | 19.1 | −44.5 | 2090 |
| * 17' | | | | Not sintered at 1,160° C. | | |
| 18' | 1160 | 1670 | 1.3 | 13.5 | −36.0 | 1640 |
| 19' | 1080 | 1380 | 1.1 | 7.5 | −33.8 | 2090 |
| * 20' | 1080 | 940 | 1.1 | 13.9 | −35.4 | 2070 |

TABLE 8

| Sample No. | Firing temperature (°C.) | Electric property ε | tan δ (%) | TC (%) $|\Delta C/C|_{max}$ | bias TC (%) $\Delta C_{max\delta}$ | Mechanical property Bending strength (kg/cm$^2$) |
|---|---|---|---|---|---|---|
| 21' | 1130 | 1930 | 1.5 | 7.4 | −34.0 | 2040 |
| 22' | 1130 | 1840 | 1.7 | 7.3 | −33.5 | 2010 |
| 23' | 1130 | 1940 | 1.6 | 7.4 | −34.3 | 1990 |
| 24' | 1130 | 1990 | 1.7 | 7.4 | −33.0 | 2020 |
| 25' | 1130 | 1870 | 1.5 | 7.3 | −33.5 | 2040 |
| 26' | 1130 | 1870 | 1.9 | 7.3 | −33.9 | 1960 |
| 27' | 1130 | 1860 | 2.0 | 7.3 | −32.3 | 1970 |
| 28' | 1130 | 1900 | 2.0 | 7.4 | −35.6 | 1970 |
| 29' | 1130 | 1890 | 2.1 | 7.3 | −33.3 | 1960 |
| * 30' | 1130 | 1880 | 2.8 | 12.1 | −33.0 | 1980 |

The reason why the range of the amount of main component, first subsidiary component and second subsidiary component are limited herein will be described hereinafter.

First, the reason why the range of the main component is limited hereinafter will be described hereinafter.

As demonstrated by Sample Nos. 9 and 9' in Tables 1 and 5, when the value a, i.e., the amount of ZnO falls below 0.5 mol %, TC disadvantageously exceeds 15% and the bending strength disadvantageously falls below 1,500 kg/cm$^2$. On the other hand, as demonstrated by Sample Nos. 10 and 10', when the value a exceeds 4.5 mol %, bias TC disadvantageously falls below −40% and TC exceeds 15%.

As demonstrated by Sample Nos. 11 and 11' in Tables 1 and 5, when the value b, i.e., the amount of $2Bi_2O_3.3ZrO_2$ or $2Bi_2O_3.3SnO_2$ falls below 0.5 mol %, TC disadvantageously exceeds 15% and the bending strength disadvantageously falls below 1,500 kg/cm$^2$. On the other hand, as demonstrated by Sample Nos. 12 and 12', when the value b exceeds 4.5 mol %, ε disadvantageously falls below 1,000.

As demonstrated by Sample Nos. 13 and 13' in Table 1 and 5, when the value c, i.e., the amount of $Ta_2O_5$ falls below 0.5 mol % or as demonstrated by Sample Nos. 14 and 14' in Tables 1 and 5, when the value c exceeds 4.5 mol %, TC disadvantageously exceeds 15%.

As demonstrated by Sample Nos. 15 and 15' in Tables 1 and 5, when the value d, i.e., the amount of $Re_2O_3$ falls below 0.5 mol %, or as demonstrated by Sample Nos. 16 and 16' in Tables 1 and 5, when the value d exceeds 5.5 mol %, TC disadvantageously exceeds 15% and bias TC disadvantageously falls below −40%.

The reason why the range of the first subsidiary component is limited herein will be described hereinafter.

As demonstrated by Sample Nos. 17 and 17' in Tables 1 and 5, when the added amount of the first subsidiary component falls below 0.05% by weight, the sintering temperature disadvantageously exceeds 1,160° C. On the other hand, as demonstrated by Sample Nos. 20 and 20', when the added amount of the first subsidiary component exceeds 2.5% by weight, ε disadvantageously falls below 1,000.

The reason why the range of the second subsidiary component is limited herein will be described hereinafter.

As demonstrated by Sample Nos. 30 and 30' in Tables 2 and 6, when the added amount of the second subsidiary component exceeds 0.5% by weight, tanδ disadvantageously exceeds 2.5%.

In the foregoing examples, as the first subsidiary component a $BaO$—$SrO$—$CaO$—$Li_2O$—$SiO_2$ oxide glass was used. The sintering aid as the first subsidiary component which lowers the calcining temperature to not higher than 1,160° C. is not limited to such an oxide glass. For example, a boron-containing oxide glass such as BaO—$Li_2O$—$B_2O_3$—$SiO_2$ glass may be used. Alternatively, a glass including monoxide components such as $SiO_2$—$B_4C$ glass may be used.

In the foregoing examples, a first subsidiary component was previously blended in a predetermined mixing ratio. It was heat-treated and melted at an elevated temperature, ground, and then vitrified. The first subsidiary component was then added to the main component of the ceramic composition. However, other methods for blending the main component and the first subsidiary component may be used. For example, a starting material which has been modified by blending these components in a predetermined mixing ratio and then heating the blend such that it is not molten, e.g., solid solution such as $Bi_4Zr_3O_{12}$ may be added. Alternatively, the various constituting elements of the first subsidiary component may be separately added to the main component in the form of proper compound such as metal alkoxide.

In the foregoing examples, the second subsidiary component was previously added in the form of oxide. However, in the stage of preparation of starting material, the second subsidiary component may be used in a form that can become an oxide in the stage of calcination or calcining, such as carbonate of various elements.

While the invention has been described in detail and with reference to specific examples thereof, it will be apparent to one skilled in the art that various changes and modifications can be made therein without departing from the spirit and scope thereof.

What is claimed is:

1. A dielectric ceramic composition, comprising from 97.5 to 99.95% by weight of a main component and from 0.05 to 2.5% by weight of a first subsidiary component, said main component being a mixture represented by formula:

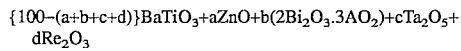

wherein A represents Zr or Sn; Re represents at least one member selected from the group consisting of La, Pr, Nd, Sm, Dy and Er; and {100–(a+b+c+d)}, a, b, c, and d represent the contents of $BaTiO_3$, ZnO, $(2Bi_2O_3.3AO_2)$, $Ta_2O_5$, and $Re_2O_3$ in terms of molar percent, respectively, provided that a, b, c, and d satisfy the following relationships:

| |
|---|
| $0.5 \leqq a \leqq 4.5$ |
| $0.5 \leqq b \leqq 4.5$ |
| $0.5 \leqq c \leqq 4.5$ |
| $0.5 \leqq d \leqq 5.5$ | said first subsidiary component being glass mainly comprising $SiO_2$.

2. A dielectric ceramic composition, comprising from 97.0 to 99.94% by weight of a main component, from 0.05 to 2.5% by weight of a first subsidiary component, and from 0.01 to 0.5% by weight of a second subsidiary component, said main component being a mixture represented by formula:

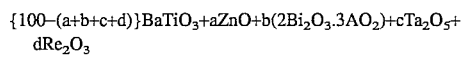

wherein A represents Zr or Sn; Re represents at least one member selected from the group consisting of La, Pr, Nd, Sm, Dy and Er; and {100–(a+b+c+d)}, a, b, c, and d represent the contents of $BaTiO_3$, ZnO, $(2Bi_2O_3.3AO_2)$, $Ta_2O_5$, and $Re_2O_3$ in terms of molar percent, respectively, provided that a, b, c, and d satisfy the following relationships:

| |
|---|
| $0.5 \leqq a \leqq 4.5$ |
| $0.5 \leqq b \leqq 4.5$ |
| $0.5 \leqq c \leqq 4.5$ |
| $0.5 \leqq d \leqq 5.5$ | said first subsidiary component being glass mainly comprising $SiO_2$, and said second subsidiary component being at least one member selected from the group consisting of oxides of Cr, Mn, Fe, Co, and Ni.

3. The dielectric ceramic composition of claim 2 wherein the mole percent of a is 1 to 4, of b is 2 to 4, of c is 1 to 4 and of d is 1 to 2.5, the amount of the main component is 98 to 99.5% by weight and the amount of the first subsidiary component is 0.5 to 2% by weight.

4. The dielectric ceramic composition of claim 3 in which A is Zr.

5. The dielectric ceramic composition of claim 3 in which A is Sn.

6. The dielectric ceramic composition of claim 3 in which Re represents at least one member of the group consisting of Nd and Pr.

7. The dielectric ceramic composition of claim 6 in which the second subsidiary component is at least one member selected from the group consisting of the oxides of Mn, Ni and Co.

8. The dielectric ceramic composition of claim 1 wherein the mole percent of a is 1 to 4, of b is 2 to 4, of c is 1 to 4 and of d is 1 to 2.5, the amount of the main component is 98 to 99.5% by weight and the amount of the first subsidiary component is 0.5 to 2% by weight.

9. The dielectric ceramic composition of claim 8 in which A is Zr.

10. The dielectric ceramic composition of claim 8 in which A is Sn.

11. A dielectric ceramic composition of claim 8 in which Re represents at least one member of the group consisting of Nd and Pr.

* * * * *